(12) United States Patent
Fukunaga et al.

(10) Patent No.: US 8,419,061 B2
(45) Date of Patent: Apr. 16, 2013

(54) TRACTOR

(75) Inventors: Tomofumi Fukunaga, Sakai (JP);
Yutaka Kitano, Kawachinagano (JP)

(73) Assignee: Kubota Corporation, Osaka (JP)

( * ) Notice: Subject to any disclaimer, the term of this patent is extended or adjusted under 35 U.S.C. 154(b) by 176 days.

(21) Appl. No.: 13/052,845

(22) Filed: Mar. 21, 2011

(65) Prior Publication Data

US 2011/0233909 A1    Sep. 29, 2011

(30) Foreign Application Priority Data

Mar. 24, 2010    (JP) .................................. 2010-068306

(51) Int. Cl.
*B60R 21/11* (2006.01)

(52) U.S. Cl.
USPC ............................ 280/756; 280/854; 296/198

(58) Field of Classification Search ................. 280/756, 280/854; 296/198, 190.03
See application file for complete search history.

(56) References Cited

U.S. PATENT DOCUMENTS

| 3,712,664 | A | * | 1/1973 | May ................................ 296/102 |
| 4,049,294 | A | * | 9/1977 | Atherton ......................... 280/756 |
| 4,094,545 | A | * | 6/1978 | Kramer ....................... 296/190.08 |
| 4,158,460 | A | * | 6/1979 | White ............................. 280/756 |
| 4,159,835 | A | * | 7/1979 | Leja et al. ...................... 280/756 |
| 4,182,456 | A | * | 1/1980 | Paul ............................... 414/685 |
| 4,669,565 | A | * | 6/1987 | Miki et al. ................... 180/89.12 |
| 4,924,959 | A | * | 5/1990 | Handa et al. ................... 180/297 |
| 4,949,991 | A | * | 8/1990 | Ludwig .......................... 280/756 |
| 5,248,237 | A | * | 9/1993 | Nakamura ..................... 414/686 |
| 5,839,758 | A | * | 11/1998 | Finch et al. .................... 280/756 |
| 6,322,133 | B1 | * | 11/2001 | Yantek et al. ............. 296/190.03 |
| 6,729,431 | B2 | * | 5/2004 | Osuga et al. ................... 180/312 |
| 7,001,134 | B2 | * | 2/2006 | Aoki et al. ..................... 414/686 |
| 7,086,691 | B2 | * | 8/2006 | Kennedy et al. ............... 296/198 |
| 7,396,047 | B1 | * | 7/2008 | Young ............................ 280/756 |
| D578,142 | S | * | 10/2008 | Ewringmann ................. D15/22 |
| 7,641,234 | B1 | * | 1/2010 | Pelnar ............................ 280/756 |
| 7,717,219 | B2 | * | 5/2010 | David ............................ 180/291 |
| 7,793,747 | B2 | * | 9/2010 | Brown ........................... 180/219 |
| 7,950,696 | B2 | * | 5/2011 | Robertson et al. ............. 280/756 |
| 8,016,320 | B2 | * | 9/2011 | Becker .......................... 280/756 |
| 8,029,019 | B2 | * | 10/2011 | Schmidt et al. ............... 280/756 |
| 8,087,694 | B2 | * | 1/2012 | Johnson et al. ................ 280/756 |
| 2010/0001571 | A1 | | 1/2010 | Miyamaru et al. |

FOREIGN PATENT DOCUMENTS

JP            201013000 A       1/2010

* cited by examiner

*Primary Examiner* — Nicole Verley
(74) *Attorney, Agent, or Firm* — The Webb Law Firm

(57) ABSTRACT

A tractor includes a ROPS frame having right and left leg portions connected to either a transmission case or rear axle cases, a front frame connected to a portion of the transmission case forwardly of the ROPS frame and extending in the right/left direction, a right attaching frame connected to and between the right leg portion of the ROPS frame and a right side portion of the front frame and extending in the fore/aft direction, a left attaching frame connected to and between the left leg portion of the ROPS frame and a left side portion of the front frame and extending in the fore/aft direction, and right and left fenders. The right fender is attached to the right attaching frame and the left fender is attached to the left attaching frame.

4 Claims, 5 Drawing Sheets

TRACTOR

BACKGROUND OF THE INVENTION

1. Field of the Invention

The present invention relates to a tractor having a Rollover Protection Structure (ROPS); frame and right and left fenders.

2. Description of the Related Art

Conventionally, as an example of tractor of the above-noted type, a tractor is known from the Japanese Unexamined Patent Application Publication No. 2010-13000 (FIG. 5). In this tractor, to a transmission case thereof, there are attached a plurality of right and left transverse frames extending in the right/left direction. To the leading ends of the right transverse frames, there is attached a right attaching frame that extends in the fore/aft direction. To the leading ends of the left transverse frames, there is attached a left attaching frame that extends in the fore/aft direction. And, a right wheel fender is attached to the outer side face of the right attaching frame and a left wheel fender is attached to the outer side face of the left attaching frame.

In the case of the conventional tractor described above, the plurality of right and left transverse frames need to be provided in order to allow stable support for the right attaching frame to which the right wheel fender is attached and stable support for the left attaching frame to which the left wheel fender is attached. For this reason, the number of components of the transverse frames was large.

SUMMARY OF THE INVENTION

There is a need for a tractor having a fender attaching arrangement not available from the conventional art. One example thereof is a tractor having a fender attaching arrangement capable of supporting the fenders in a reliable manner with a simple construction.

A tractor according to the present invention, comprises:

a ROPS frame having right and left leg portions connected to either a transmission case or rear axle cases;

a front frame connected to a portion of said transmission case forwardly of said ROPS frame and extending in the right/left direction;

a right attaching frame connected to and between the right leg portion of the ROPS frame and a right side portion of the front frame and extending in the fore/aft direction;

a left attaching frame connected to and between the left leg portion of the ROPS frame and a left side portion of the front frame and extending in the fore/aft direction; and right and left fenders;

wherein said right fender is attached to said right attaching frame and said left fender is attached to said left attaching frame.

With the above-described construction, the right fender is supported by the right attaching frame connected to and between the right leg portion of the ROPS frame and a right side portion of the front frame and the left fender is supported by the left attaching frame connected to and between the left leg portion of the ROPS frame and a left side portion of the front frame. That is, the ROPS frame provided with enhanced strength in order to protect a driver at the time of rollover of the tractor is utilized also as an arrangement for supporting the right and left attaching frames. With this, the rigidness around the right and left fenders can be secured and at the same time the arrangement for supporting the right and left fenders can be simplified by eliminating the need for a plurality of transverse frames e.g. or decreasing the number of the transverse frames, and the fenders can be supported in a stable manner at the same time.

Preferably, said fenders are attached to the respective attaching frames in such a manner that the rear end of a lateral wall portion of each right/left fender does not project rearward beyond the rear face of the leg portion of the ROPS frame.

With the above-described construction, the rear end of the lateral wall portion of the right fender does not project rearward beyond the rear face of the right leg portion of the ROPS frame and the rear end of the lateral wall portion of the left fender does not project rearward beyond the rear face of the left leg portion of the ROPS frame. Therefore, during a reverse driving of the tractor, accidental contact of the lateral wall portions of the fenders with a building or the like present rearward and resultant damage thereto can be avoided.

Preferably, a forwardly oriented bracket is connected to each said right/left leg portion and a rear portion of the right/left attaching frame is connected to said bracket.

With the above-described construction, a forwardly oriented bracket is connected to each one of the right/left leg portions and a rear portion of the right/left attaching frame is connected to this bracket. With this, prior to attachment of the ROPS frame to the vehicle body, the relatively short brackets project forwardly from the respective leg portions. In comparison with an arrangement wherein the rear portions of the attaching frames are directly attached to the respective right and left leg portions, the ROPS frame prior to its attachment to the vehicle body can be kept compact, so that handling performance thereof at the time of assembly or shipping, etc. can be improved.

Preferably, said bracket, the rear end of the attaching frame and the fender corresponding thereto are bolt-fastened together in such a manner that the attaching frame is positioned outside in the right/left direction of the bracket and the fender is positioned outside in the right/left direction of this attaching frame; and the other portion of the attaching frame other than the rear portion and the fender are bolt-fastened together in such a manner that the fender is positioned outside in the right/left direction of the attaching frame.

With the above-described construction, the right bracket, the rear portion of the right attaching frame and the right fender are bolt-fastened together and the left bracket, the rear portion of the left attaching frame and the left fender are bolt-fastened together. Hence, attachment and detachment of the right attaching frame and the right fender to/from the right bracket can be performed at one time. And, attachment and detachment of the left attaching frame and the left fender to/from the left bracket can be performed at one time. Therefore, the interconnecting construction of the right attaching frame and the right fender to/from the right bracket and the interconnecting construction of the left attaching frame and the left fender to/from the left bracket can be simplified and also, the replacement operations of the right and left fenders can be performed in a simple manner.

DETAILED DESCRIPTION OF THE PREFERRED EMBODIMENTS

Next, a tractor relating to the present invention will be described.

Figure 1:
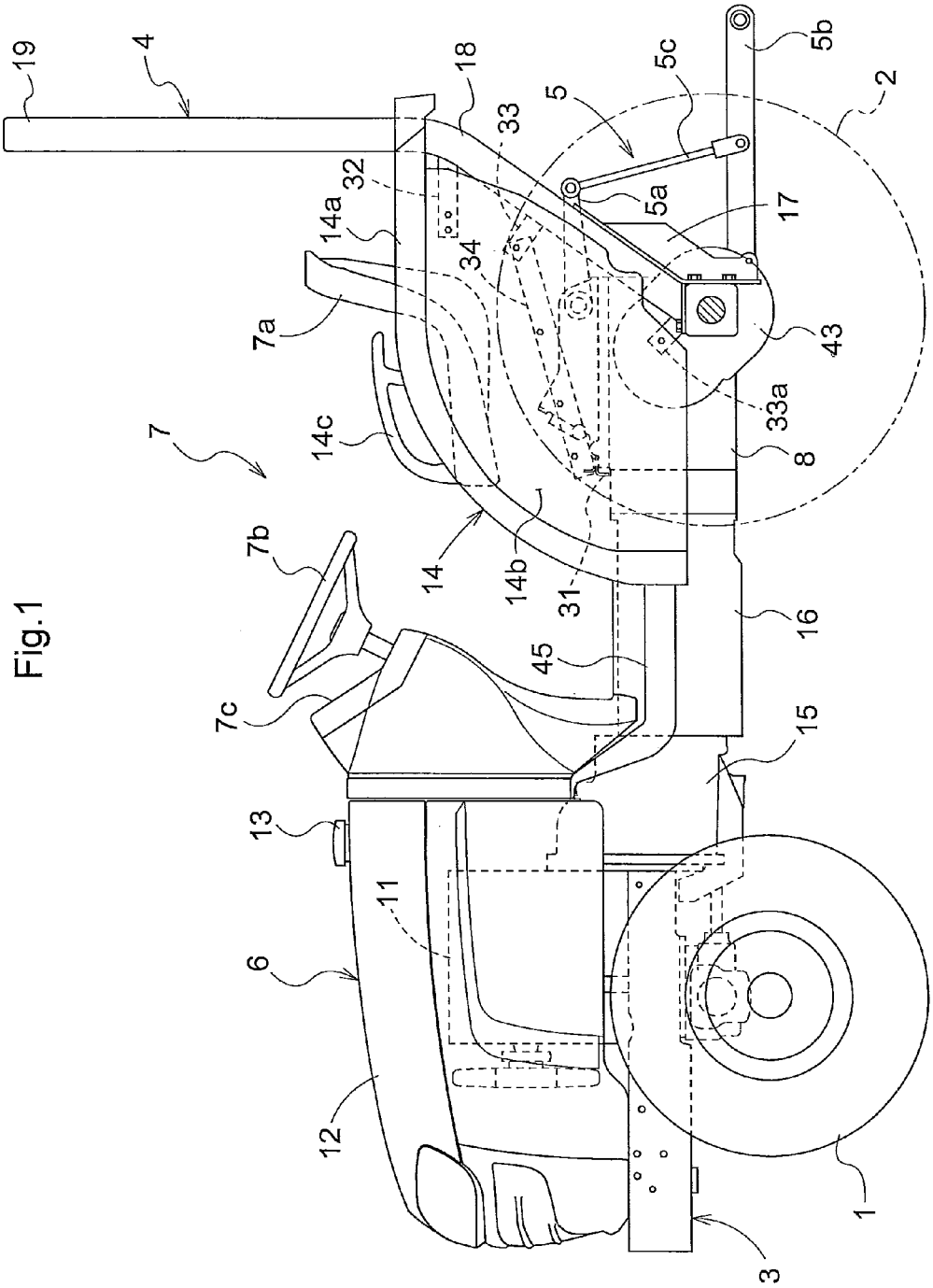
FIG. 1 is a side view showing a tractor.
Figure 2:
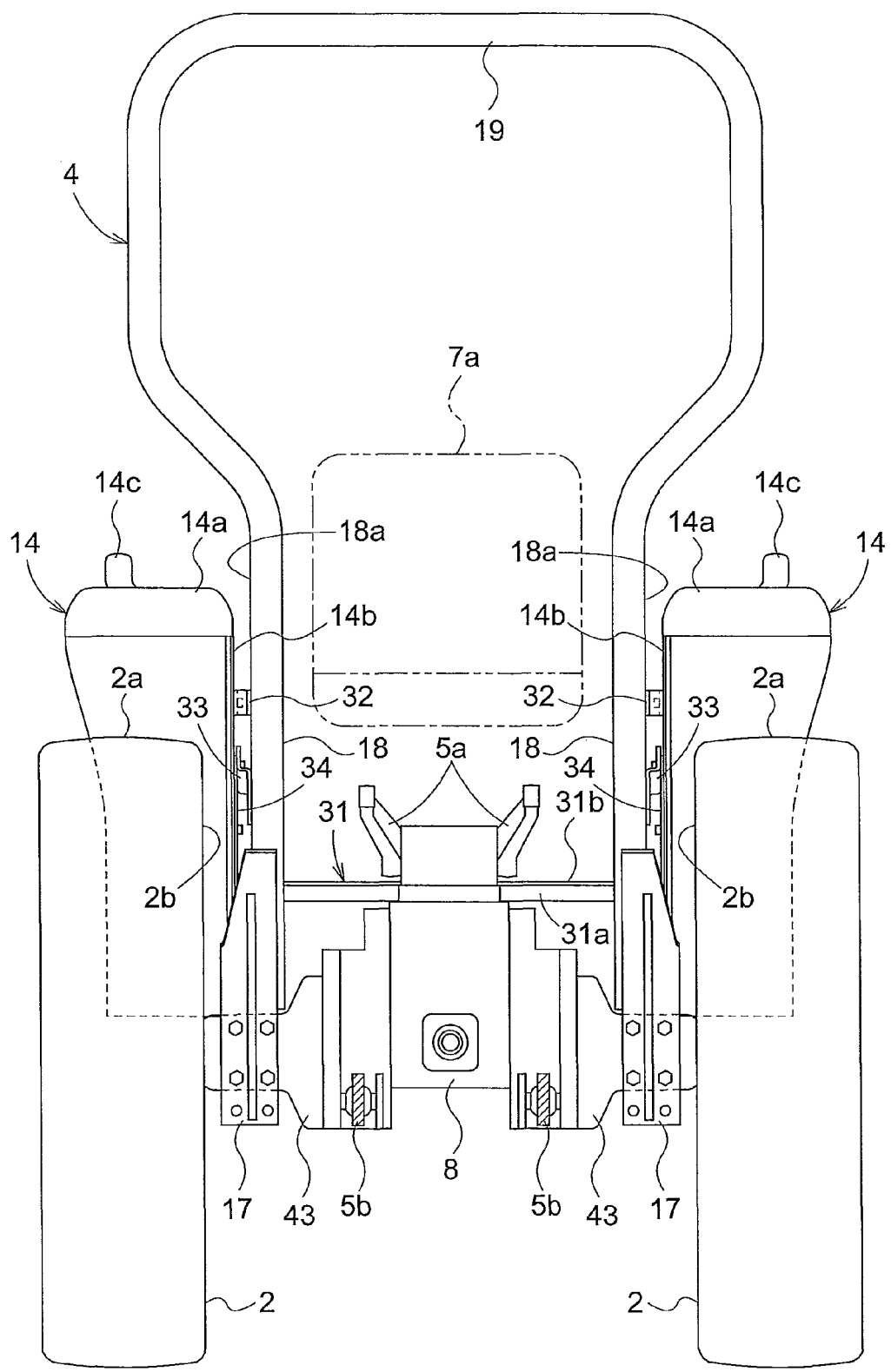
FIG. 2 is a rear view showing the tractor.
Figure 3:
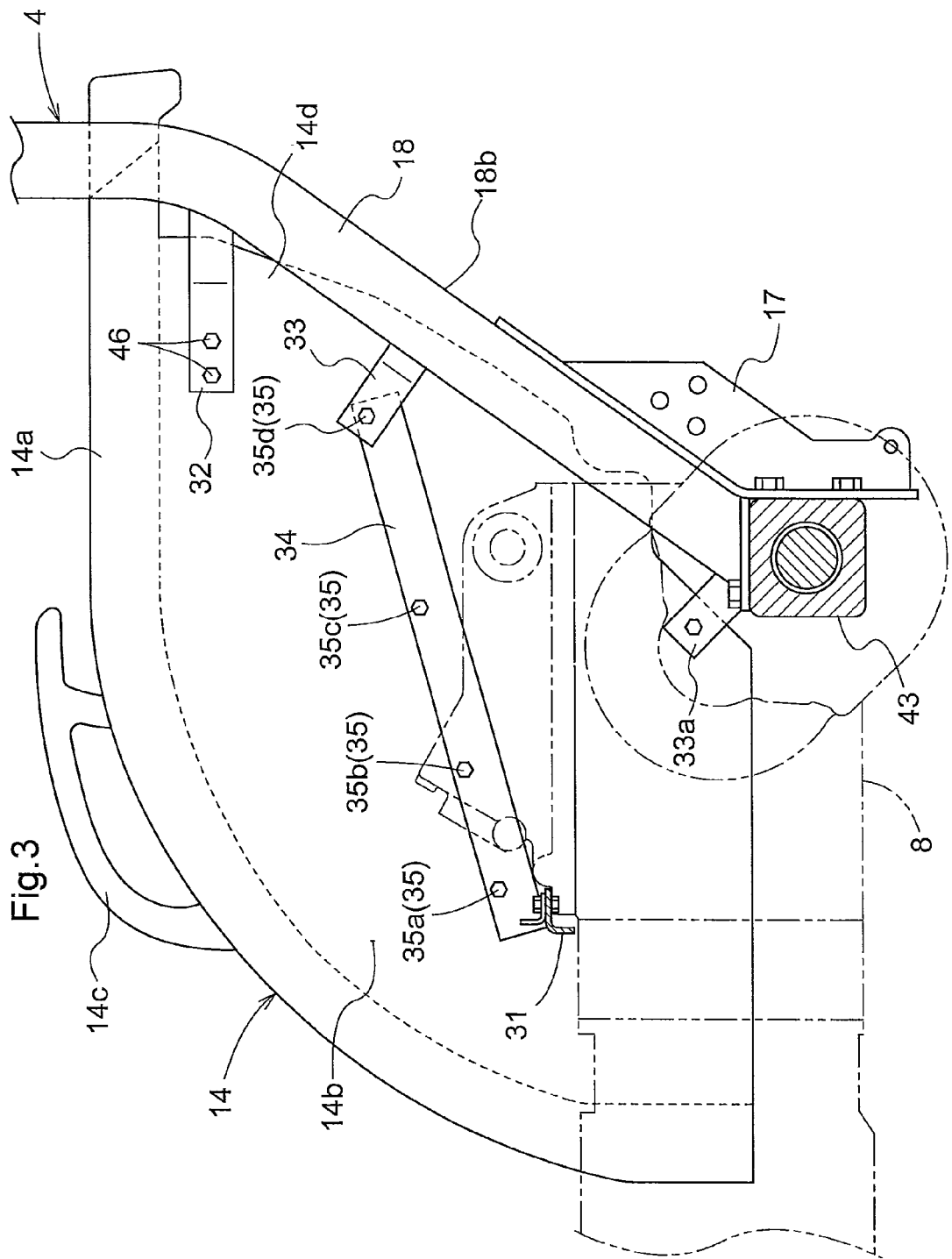
FIG. 3 is a side view showing attachment arrangement of a rear wheel fender.

As shown in FIG. 1 and FIG. 2, the tractor includes a self-propelling traveling vehicle body, a ROPS frame 4 provided at a rear portion of the self-propelling vehicle body, and a link mechanism 5. The traveling vehicle body includes right and left front wheels 1 and right and left rear wheels 2. The right and left front wheels 1 are steerable. At a front portion of the self-propelling vehicle body, an engine unit 6 is mounted and at a fore/aft intermediate portion thereof a driver's section 7 is mounted. And, at a rear portion thereof, a transmission case 8 is mounted.

As shown in FIG. 1, the engine unit 6 includes a clutch housing 15, an engine 11, an engine hood 12 covering the engine 11, a fuel tank 13 provided at a rear portion of the engine hood 12. The engine 11 is supported to a vehicle body frame 3 and the front wheels 1 too are supported to this vehicle body frame 3.

As shown in FIGS. 1 through 4, the driver's section 7 includes a driver's seat 7a, a floor portion 45, a steering wheel 7b and a control panel 7c. The driver's seat 7a is disposed between rear wheel fenders 14 (an example of "fender"). The floor portion 45, the steering wheel 7b and the control panel 7c are located forwardly of the driver's seat 7a. The right and left rear wheel fenders 14 each includes a ceiling wall portion 14a for covering an outer peripheral portion 2a of the rear wheel 2 corresponding thereto, and a lateral wall portion 14b opposed to a right/left inner face 2b of the corresponding rear wheel 2. The ceiling portion 14a is formed as a forwardly lowered curved portion whereas the lateral wall portion 14b is formed like a flat plate. At the center of the upper face of the ceiling wall portion 14a, a hand grip 14c is attached.

To the rear side of the engine 11, a clutch housing 15 is connected. And, to the rear portion of this clutch housing 15, a case 16 is connected. And, to the rear portion of this case 16, a transmission case 8 is connected. The transmission case 8 mounts therein a hydrostatic stepless speed changing unit (not shown), an auxiliary speed changing unit (not shown), etc. Power of the engine 11 is transmitted from the clutch housing 15 via the hydrostatic stepless speed changing unit (not shown), the auxiliary speed changing unit (not shown) to the rear wheels 2. Further, the power taken off from the auxiliary speed changing unit is transmitted to the front wheels 1.

Figure 6:
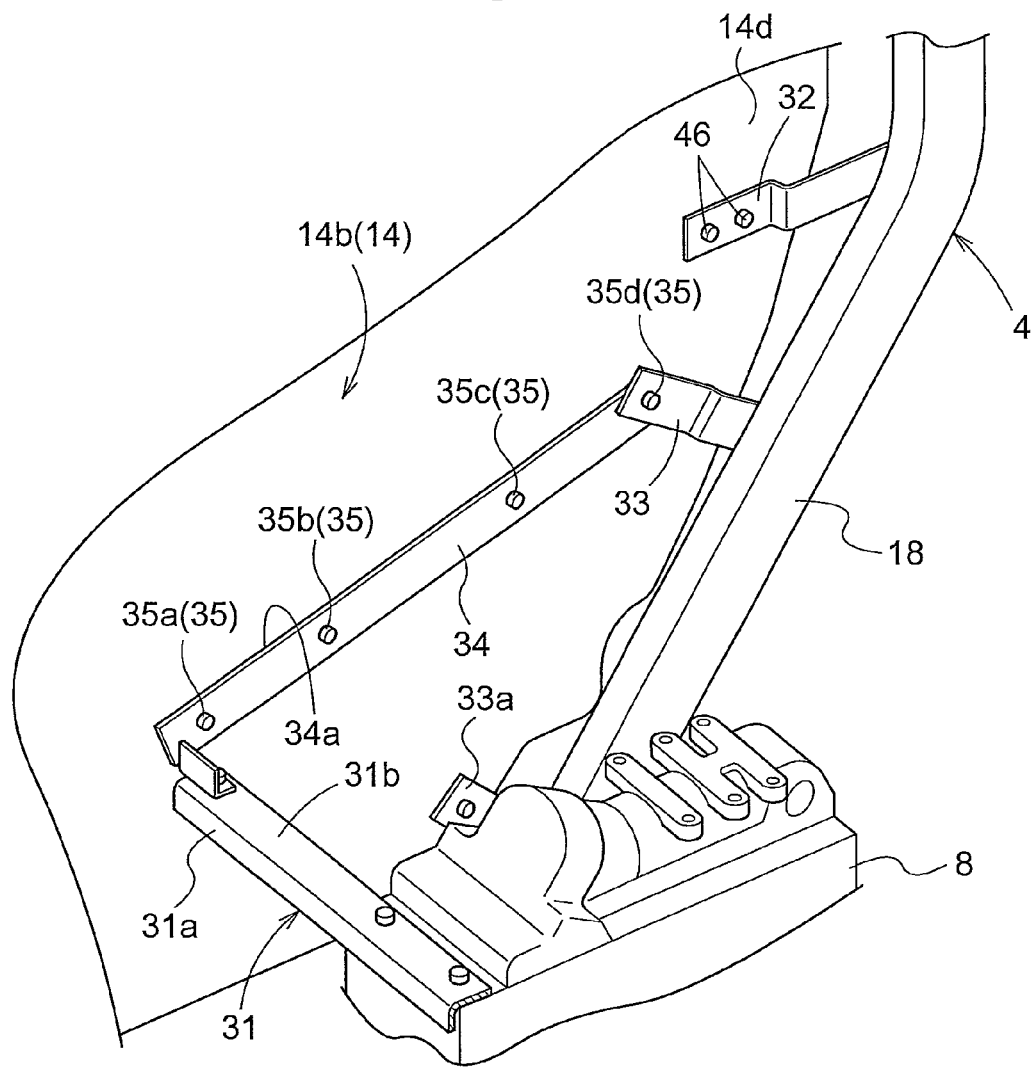
FIG. 6 is a perspective view showing the attachment arrangement of the rear wheel fender.
Figure 7:
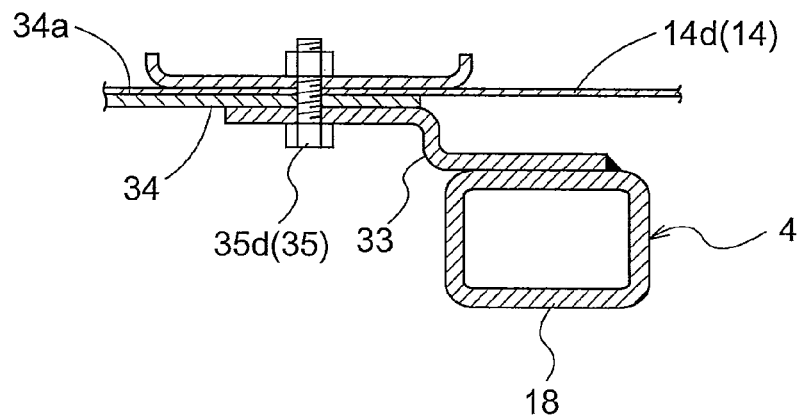
FIG. 7 is a plan view in section showing a condition where a rear wheel fender is supported by a leg portion of a ROPS frame.

As shown in FIGS. 1 through 4 and in FIG. 6, the ROPS frame 4 includes right and left leg portions 18 and a loop-like interconnecting portion 19 interconnecting these leg portions 18. The leg portions 18 and the interconnecting portion 19 can be formed integral or formed as separate members. To the right and left outer sides of the transmission case 8, right and left rear axle cases 43 are connected respectively. Further, to each rear axle case 43, a frame attaching member 17 is attached. Each frame attaching member 17 is placed in contact with the upper face and the rear face of the corresponding rear axle case 43 and firmly bolt-fixed to the upper portion and the rear portion of the corresponding rear axle case 43. The right leg portion 18 is attached to the right frame attaching member 17 and the left leg portion 18 is attached to the left frame attaching member 17, respectively by means of welding or the like. Each leg portion 18 extends obliquely rearwardly upward from the frame attaching member 17.

As shown in FIG. 1, the link mechanism 5 includes right and left lift arms 5a, right and left lower links 5b, right and left lift rods 5c and a lift cylinder (not shown). The right lift arm 5a is attached to the upper right portion of the transmission case 8 to be vertically pivotable relative thereto. The left lift arm 5a is attached to the upper left portion of the transmission case 8 to be vertically pivotable relative thereto. The right lower link 5b is attached to the lower right portion of the transmission case 8 to be vertically pivotable relative thereto. The left lower link 5b is attached to the lower left portion of the transmission case 8 to be vertically pivotable relative thereto. The right lift rod 5c interconnects the right lift arm 5a and the right lower link 5b. The left lift rod 5c interconnects the left lift arm 5a and the left lower link 5b. The lift cylinder effects vertical pivotal operations of the right and left lift arms 5a. This link mechanism 5 can be embodied as a four-point linkage mechanism for example.

As shown in FIGS. 1 through 4 and FIG. 6, to a portion of the transmission case 8 forwardly of the ROPS frame 4, there is connected a front frame 31 extending straight in the right/left direction. Incidentally, in this embodiment, this front frame 31 is constructed like an angle component having a front wall portion 31a and an upper wall portion 31b. Instead, the front frame 31 can have a different shape with a channel-like cross sectional shape, for instance.

To the right/left outer faces 18a of the right/left leg portions 18, there are connected by means of e.g. welding respectively, forwardly oriented right and left upper brackets 32, obliquely forwardly upwardly oriented lower brackets 33 (an example of "bracket) and obliquely forwardly upwardly oriented right and left lower end brackets 33a.

There are provided right and left attaching frames 34 that extend in the fore/aft direction. A front end portion of the right attaching frame 34 is connected to a right portion of the front frame 31 and a rear end portion thereof is attached to a leading end of the right lower bracket 33. A front end portion of the left attaching frame 34 is connected to a left portion of the front frame 31 and a rear end portion thereof is attached to a leading end of the left lower bracket 33. With these arrangements, each attaching frame 34 is disposed under an obliquely forwardly downwardly inclined posture. And, each attaching frame 34 is formed of e.g. a flat bar in the form of a vertically flat plate in its cross sectional shape. And, the outer face of each flat bar acts as a contact face contacting the side wall portion 14b of the corresponding rear wheel fender 14. Incidentally, as the right and left attaching frames 34, other members such as L-shaped angle members or inwardly angular hooked shape channel members can be employed also.

To the lower end portion of the outer face 18a of the right/left leg portion 18, there is connected a right/left lower end bracket 33a which is oriented obliquely forwardly upward. The upper bracket 32, the lower bracket 33 and the lower end bracket 33a are bent in the form of cranks, so that a predetermined gap is formed between the outer face 18a of the leg portion 18 and the lateral wall portion 14b of the rear wheel fender 14.

To a right/left outer face 34a of each attaching frame 34, the lateral wall portion 14b of the corresponding rear wheel fender 14 is connected by means of bolts 35.

More particularly, as shown in FIG. 3, FIG. 4, FIG. 6 and FIG. 7, the other portion of each attaching frame 34 other than the rear end and the other portion of the corresponding rear wheel fender 34 other than the rear end portion of the lateral wall portion 14b are connected to each other by the bolts 35a through 35c of the plurality of bolts 35 other than the bolt 35d located at the most rearward side.

The rear ends 14d of the lateral wall portions 14b of the right and left rear wheel fenders 14 are configured not to project beyond the rear faces 18b of the right and left leg portions 18.

To the leading end portions of the right and left lower brackets 33, the rear end portions of the right and left attaching frames 34 and the upward portions of the rear ends 14d of the right and left rear wheel fenders 14 are connected and fastened together by the bolts 35d.

To the leading end portion of each upper bracket 32, there is connected an upper end portion of the rear end 14d of the corresponding rear wheel fender 14 by means of a bolt 46. To the leading end of each lower end bracket 33a, there is bolt-connected a lower rear end portion of the corresponding rear wheel fender 14.

In this way, by utilizing the ROPS frame 4 provided with enhanced strength for protecting a driver at the time of rollover of the tractor as an arrangement for supporting the right and left rear wheel fenders 14, the arrangement for supporting the right and left rear wheel fenders 14 is simplified and at the same time, the rear wheel fenders 14 can be supported to the ROPS frame 4 in a stable manner.

Figure 4:
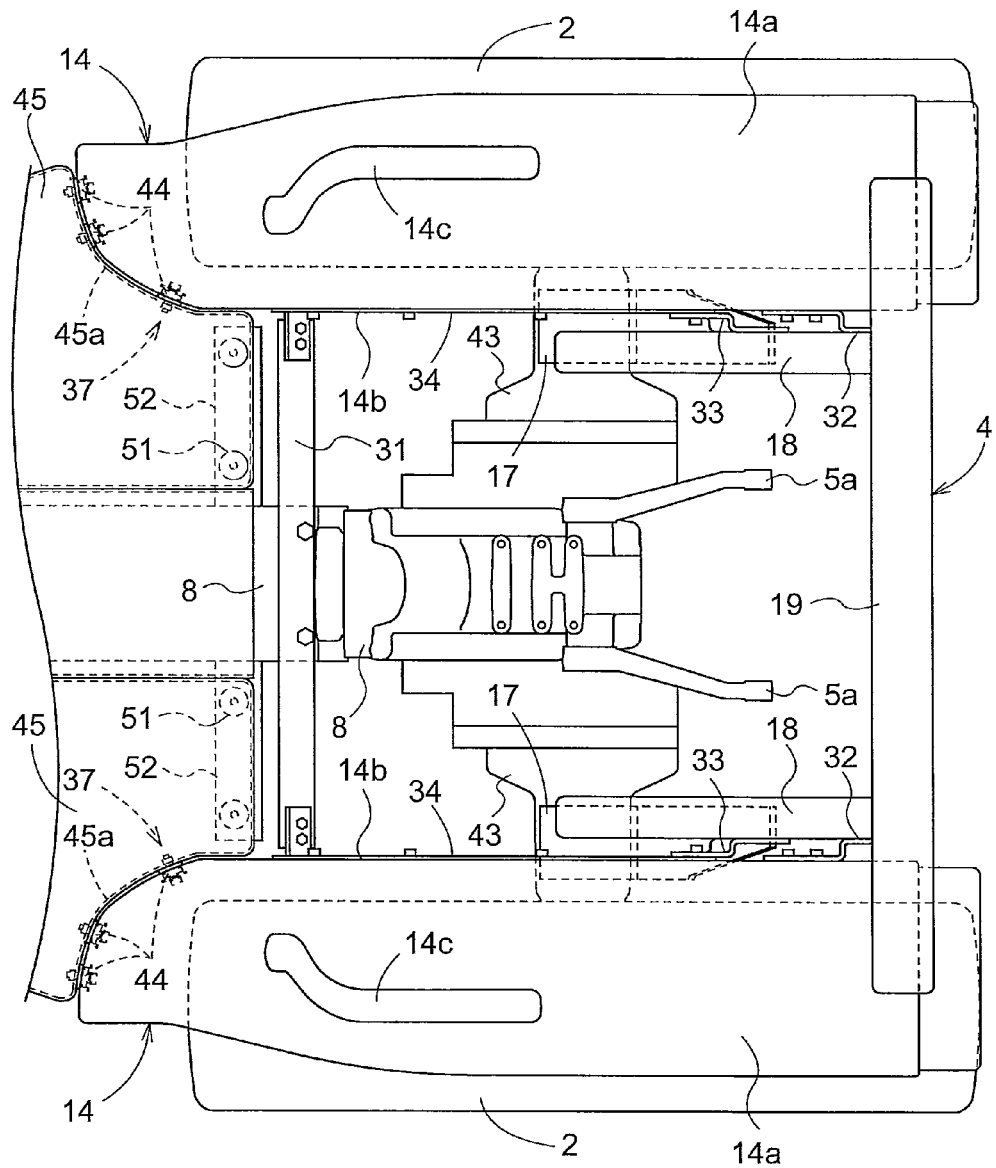
FIG. 4 is a plan view showing attachment arrangement of the rear wheel fender.
Figure 5:
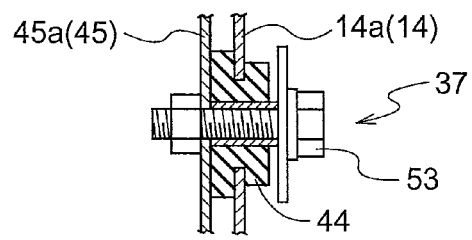
FIG. 5 is a vertical section showing interconnecting arrangement for interconnecting the rear wheel fender and a floor portion.

As shown in FIG. 4 and FIG. 5, there is provided an interconnection arrangement 37 for interconnecting the right and left rear wheel fenders 14 with the floor portion 45. Specifically, edge portions of bores formed at a front portion of the ceiling wall portion 14a of the right/left rear wheel fender 14 are fitted into peripheral grooves formed along the peripheral direction in the outer periphery of cylindrical anti-vibration rubbers 44. With this, the anti-vibration rubbers 44 are attached to the front portion of the ceiling wall portion 14 of the right/left rear wheel fender 14. A bolt 53 is inserted and fastened into a hole formed at the center of each anti-vibration rubber 44 and a hole formed in a rib 45a projecting downward from the rear end of the floor portion 45. To the opposed lateral sides of the transmission case 8, there are attached right and left transversely oriented stays 52, and anti-vibration rubbers 51 are provided between the upper faces of the stays 52 and the lower face of the rear end portion of the floor portion 45.

With the above, the anti-vibration rubbers 44 are interposed between the front portions of the ceiling wall portions 14a of the right and left rear wheel fenders 14 and the rear ends of the floor portion 45 and also the anti-vibration rubbers 51 are interposed between the stays 52 and the rear end portion of the floor portion 45. As a result, transmission of vibration from the transmission case 8 to the floor portion 45 can be prevented.

When the ROPS frame 4 is detached, each attaching frame 34 is supported in a cantilever manner to the front frame 31. Therefore, if the tractor is transported with the ROPS frame 4 detached therefrom, there is the risk that the attaching frames 34 and/or the front frame 31 may be bent by vibration or shock during the transport or the attaching frames 34 may be inadvertently detached from the front frame 31, thus leading to detachment of the rear wheel fenders 14.

In view of the above, there is provided a transport frame (not shown) for interconnecting the transmission case 8 with the right and left attaching frames 34, so as to provide temporary fixation and support of the right and left rear wheel fenders 14. With this arrangement, such damage to the front frame 31 or the detachment of the rear wheel fenders 14 during transport of the tractor are avoided. In this regard, it should be noted, however, that in the above case of providing a transport frame for interconnecting the transmission case 8 with the right and left attaching frames 34, this transport frame is provided merely for temporarily fixing and supporting the rear wheel fenders 14, not for supporting the rear wheel fenders 14 permanently.

Therefore, it is not necessary to provide the transport frame with high supporting strength and the construction of this transport frame can be simple. Incidentally, after the tractor is transported with the ROPS frame 4 detached therefrom, the ROPS frame 4 is to be attached again to the tractor and the attaching frames 34 are to be connected to this ROPS frame 4. In this, the transport frame will be removed. However, there arises no problem even when the transport frame is kept attached.

Other Embodiments (1) To the right attaching frame 34, the ceiling wall portion 14a of the right rear wheel fender 14 can be attached, and to the left attaching frame 34, the ceiling wall portion 14a of the left rear wheel fender 14 can be attached. In this case, the hand grip 14c can be attached to each one of the right and left attaching frames 34.

(2) With omission of the right and left lower brackets 33, the right attaching frame 34 can be connected between and across the right leg portion 18 and the right side portion of the front frame 31 and the left attaching frame 34 can be connected between and across the left leg portion 18 and the left side portion of the front frame 31. In this case, it is possible to employ an arrangement of connecting each attaching frame 34 to the leg portion 18 and/or the front frame 31 by means of welding or detachably connecting the attaching frame 34 to the leg portion 18 and/or the front frame 31 by means of bolts or the like.

(3) In the foregoing embodiment, there was described the exemplary arrangement of connecting the right leg portion 18 of the ROPS frame 4 to the right rear axle case 43 and connecting the left leg portion 18 of the ROPS frame 4 to the left rear axle case 43. However, the right and left leg portions 18 of the ROPS frame 4 can be directly connected to the transmission case 8.

(4) The front frame 31 can be divided into two parts, i.e. right and left front frame parts, with the right front frame part being connected to the transmission case 8 and extending to the right and the left front frame part being connected to the transmission case 8 and extending to the left.

(5) It is possible to employ a further arrangement wherein the floor portion 45 and the lower end of the ROPS frame 4 are connected through the fore/aft frame to be formed integral with each other, the floor portion 45 is supported to e.g. the case 16 via an anti-vibration member (rubber mount) and the ROPS frame 4 is supported to the transmission case 8 or the rear axle case 43 via an anti-vibration member (rubber mount). And, in this supporting arrangement, like the foregoing embodiment, it is possible employ an arrangement of the rear wheel fenders 14 being supported to the ROPS frame 4.

The invention claimed is:
1. A tractor comprising:
a Rollover Protection Structure (ROPS); frame having right and left leg portions directly connected to either a transmission case or rear axle cases;
a front frame directly connected to a portion of said transmission case forwardly of said ROPS frame and extending in the right/left direction;
a right attaching frame connected to and between the right leg portion of the ROPS frame and a right side portion of the front frame and extending in the fore/aft direction;

a left attaching frame connected to and between the left leg portion of the ROPS frame and a left side portion of the front frame and extending in the fore/aft direction; and right and left fenders;

wherein said right fender is directly attached to said right attaching frame and said left fender is directly attached to said left attaching frame.

2. The tractor according to claim 1, wherein said fenders are attached to the respective attaching frames in such a manner that the rear end of a lateral wall portion of each right/left fender does not project rearward beyond the rear face of the leg portion of the ROPS frame.

3. The tractor according to claim 1, wherein a forwardly oriented bracket is connected to each said right/left leg portion and a rear portion of the right/left attaching frame is connected to said bracket.

4. The tractor according to claim 3, wherein said bracket, the rear end of right/left attaching frame; and the fender corresponding thereto are bolt-fastened together in such a manner that the attaching frame is positioned outside in the right/left direction of the bracket and the fender is positioned outside in the right/left direction of this attaching frame; and the other portion of the attaching frame other than the rear portion and the fender are bolt-fastened together in such a manner that the fender is positioned outside in the right/left direction of the attaching frame.

* * * * *